United States Patent [19]

Watanabe et al.

[11] Patent Number: 5,061,527
[45] Date of Patent: Oct. 29, 1991

[54] METHOD AND APPARATUS FOR SPRAY COATING OF REFRACTORY MATERIAL TO REFRACTORY CONSTRUCTION

[75] Inventors: Seiji Watanabe; Mitsuo Saito; Akihiko Nanba; Tsutomu Nozaki; Tetsuya Fujii; Tsuyoshi Nakamoto; Motoyasu Yaji, all of Chiba, Japan

[73] Assignee: Kawasaki Steel Corporation, Japan

[21] Appl. No.: 632,638

[22] Filed: Dec. 26, 1990

Related U.S. Application Data

[63] Continuation of Ser. No. 43,181, Apr. 27, 1987, abandoned.

[30] Foreign Application Priority Data

Dec. 22, 1986 [JP] Japan .................................. 61-306003

[51] Int. Cl.$^5$ ............................................. B05D 1/08
[52] U.S. Cl. ..................................... 427/423; 427/422
[58] Field of Search ............... 427/422, 423; 239/79, 239/85

[56] References Cited

U.S. PATENT DOCUMENTS

| | | | |
|---|---|---|---|
| 3,800,983 | 4/1974 | Brichard et al. | 239/79 X |
| 4,093,755 | 6/1978 | Dahl et al. | 427/299 |
| 4,386,737 | 6/1983 | Antonov et al. | 239/79 |
| 4,560,591 | 12/1985 | Plumat et al. | 239/85 X |
| 4,562,961 | 1/1986 | Guenard et al. | 239/79 |
| 4,569,479 | 2/1986 | Suwa et al. | 237/79 |

FOREIGN PATENT DOCUMENTS 2035524 6/1980 United Kingdom .................. 239/85

Primary Examiner—Shrive Beck
Assistant Examiner—Alain Bashore
Attorney, Agent, or Firm—Austin R. Miller

[57] ABSTRACT

Spray coating is performed utilizing a mixture of refractory material and a combustionable metal powder. The size of the particle of the metal in the mixture is selected so that the particle size is large enough to be treated safely and is small enough to be transported by means of a gas flow. As a carrier gas for carrying the mixture, a non-combustionable gas or fuel gas is used. A fuel gas and a combustion-assisting gas are discharged toward the section to be treated on the surface for directing a combustioning frame. The refractor material with the carrier gas is discharged into the frame established by the fuel gas and the combustion-assisting gas. The average size of the metal particle to be used in the spray coating is limited to be greater than 50 $\mu$m. By enlarging the particle size of the metal, combustion of the metal particle becomes difficult. Combustion of such large particle size metal can be assisted by discharging the combustion-assisting gas together with the fuel gas. This compensates combustion efficiency to be dropped by utilizing the larger particle size metal.

2 Claims, 8 Drawing Sheets

METHOD AND APPARATUS FOR SPRAY COATING OF REFRACTORY MATERIAL TO REFRACTORY CONSTRUCTION

This application is a continuation of application Ser. No. 043,181, filed Apr. 27, 1987, now abandoned.

BACKGROUND OF THE INVENTION

1. Field of the Invention

The present invention relates generally to a method and apparatus for safely performing spray coating of a refractory material onto a refractory construction. More specifically, the invention relates to a safely and effectively repairing refractory constructions, such as coke ovens, kilns, furnaces and so forth. Further particularly, the invention relates to a spray coating technic avoiding danger in spray coating of the refractory material containing fine particles of powder state combusible metal.

2. Description of the Background Art

Coke ovens, kilns, furnaces employ refractory linings for constituting refractory constructions so as to allow substantially high temperature operations. Such refractory linings thus subject substantially high temperature for a long period of time to cause hot tear, spalling, formation of defect, crack and so forth. As is well known, the coke oven and some kind of furnaces, such as brust furnace, have to be in operation continuously throughout their lives. Accordingly, repair of such hot tears, spalling, defects, cracks and so forth is to be preformed without stopping the operation.

Conventionally, repairing operations for the refractory linings have been taken place by way of spray coating. Such spray coating process has been disclosed in the Japanese Patent Second (examined) Publication (Tokko) Showa 49-46364. In the disclosed process, a refractory material is selected to have same composition to that of the refractory lining to be repaired. The refractory material is mixed with a certain amount of fine particle of powder state combusible metal. In the spray coating operation, heat generated by combustion of the metal powder utilized for melting or half-melting the refractory material and for adhering the refractory material onto the refractory lining. At the same time, the metal oxide formed as a resultant of combustion also serves as refractory material.

In such a conventional spray coating process, it is considered that a caloric value required for performing spray coating of refractory material for repairing refractory linings is in a range of 5000 kcal/kg to 8000 kcal/kg, as recited in "Spray Coating Repair of Coke Oven" (Seitetsu Kenkyu Vol. No. 305), published on 1981, and "Development pf Spray Coating Apparatus and Study of Spray Coating Condition" ("Iron and Steel" No. 4, Vol. No. 169), 1983. Whereas the caloric value may be generated according to the process recited in the afore-mentioned publications is in a range of 2000 kcal/kg to 3000 kcal/kg. Though the proposed process includes inclusion of 20 Wt % to 30 Wt % of metal particle in the refractory material in a form a mixture, which metal particle will serves as combustioning medium. However, the caloric value to be generated by the proposed process is too small to melt or half-melt the refractory materals to be injected onto the surface of the refractory lining. This degrades adherence ability of the refractory material onto the reflactory lining. Furthermore, due to lack of caloric value, formation of satisfactorily high density refractory layer and firm adherence of the formed refractory layer on the reflactory lining have been difficult. It would be possible to increase caloric value of the heat to be generated during combustion by increasing the concentration of the metal powder. However, increasing of the amount of the metal powder concentration apparently cause increasing of the cost required for repairing.

In addition, in the prior proposed process, the metal powder is limited the particle size in diameter to be smaller than 50 $\mu$m. The metal powder of the aforementioned limited particle size is carried by oxygen flow. This makes it difficult to practical process due to high combusibility of such fine particle of metal, which causes danger in carrying and back-fire in spray coating process.

Furthermore, since the calory for spray coating is generated only by combustion of the metal particle in the aforementioned prior art, the refractory lining to be repaired cannot be heated in advance of starting spray coating. As a result, the refractory lining to be treated is rapidly heated at a spot. The heating spot of the refractory lining is rapidly cooled when the spray coating operation is terminated. This tends to cause spalling in the refractory construction to be repaired.

SUMMARY OF THE INVENTION

Therefore, it is an object of the present invention to provide a method and an apparatus for spray coating of refractory material, which can perform the operation safely and effectively.

Another object of the invention is to provide a method and an appratus for spray coating of refractory material onto a surface of a refractory construction, which allows relatively great particle size metal to be used.

A further object o the invention is to provide a method and an appratus for spray coating, which can form a frame directed toward the surface to be treated, independently of the spray coating operation for allowing moderate warming-up and cooling-off of the surface of the refractory construction in order to prevent the portion to be treated from causing spalling.

In order to accomplish the aforementioned and other objects, spray coating, according to the present invention, is performed utilizing a mixture of refractory material and a relatively large average particle size of powder state combusible metal. The size of the particle of the metal in the mixture is selected so that the particle size is large enough to be treated safely and is small enough to be transported by means of a gas flow and to be effectively combustioned without requiring substantial increase of the cost. As a carrier gas for carrying the mixture, a non-combusible gas or fuel gas and other non-oxidation gas can be used. A fuel gas and an oxygen containing combustion-assisting gas, such as oxygen gas, air and so forth, are discharged toward the section to be treated on the surface for directing a combustioning frame. The refractory material with the carrier gas is discharged
into the frame established by the fuel gas and the combustion-assisting gas.

In view of the safety in operation, the size of the metal powder to be used in the spray coating according to the invention, is limited to be greater than 50 $\mu$m in diameter. By enlarging the particle size of the metal, combusibility of the metal powder is lowered. Combustion of such large particle size metal can be assisted by discharging the combustion-assisting gas together with the fuel gas. This compensates combustion efficiency to be dropped by utilizing the larger particle size metal. Furthermore, according to the present invention, caloric value to be generated by combustion of the metal within the frame established by the combustioning gas and the combustion-assisting gas, becomes sufficient for melting or half-melting the refractory material on the surface of the refractory construction to be treated.

The metal oxide formed during combustion in the frame will form a mixture with the refractory material, as an additional refractory material. Therefore, it enables to form satisfactorily high density of refractory layer on the section to be treated.

According to one aspect of the invention, an apparatus for spray coating of a refractory material onto a reflactory construction, comprises a lance containing a first and second nozzles, first means for supplying a mixture of a powder state refractory material and a powder state combusible metal to the first nozzle for injection through the first nozzle toward a surface of the refractory construction, second means for supplying a fuel gas to the first nozzle for injection together with the mixture, and third means for supplying a combustion-assisting gas to the second nozzle, to discharge the combustion-assisting gas through the second nozzle for supplying oxygen necessary for combustion of the fuel gas and the combusible metal.

On the other hand, according to another aspect of the invention a method of spray coating of a refractory material onto a reflactory construction, comprises the steps of:

preparing a mixture of a refractory material and a fine particles of powder state combusible metal;

supplying the mixture with a non-oxidation gas to discharge through a first nozzle toward the surface of the refractory construction on which a refractory layer is to be formed;

supplying a fuel gas to the first nozzle so that the fuel gas is discharged with the mixture toward the surface;

establishing a combustioning frame by combustioning the fuel gas and the combusible metal for forming refractory oxide of the combusible metal; and supplying a combustion-assisting gas via a second nozzle which is arranged adjacent the first nozzle to discharge the combustion-assisting gas arround the combustioning frame for assisting combustion of the fuel gas and the combusible metal.

In preferred process, the mixture contains the combusible metal powder having average particle size greater than or equal to 50 $\mu$m, preferably in a range of greater than or equal to 50 $\mu$m and smaller than euqal to 160 $\mu$m, and more preferably in a range of greater than or equal to 70 $\mu$m and smaller than equal to 140 $\mu$m.

The metal powder is selected among aluminium, metal silicon and combination thereof. The material metal for forming the powder state combusible metal to be used in the aforementioned spray coating may also be selected among Al, Si, Mg, Mn, FeMn, SiMn, CaSi, FeSi, FeCr, $CaC_2$ and combination of two or more of the above. On the other hand, the refractory material is selected among silica, alumina, mullite, chamotte, zilcon, zilconia, magnesia, magnesite-chrome and combination of two or more of the above.

The content of the metal powder is in a rate greater than or equal to 10% by weight, preferably in a rate less than or equal to 30% by weight, and more preferably in a range greater than or equal to 13% by weight and less than or equal to 20% by weight.

In the preferred construction, the third means supplies the combustion-assisting gas in a supply rate at least three-times greater than the equivalent amount to the amount of the metal powder and equivalent amount to the fuel gas combustion, and more preferably in a range of supply rage greater than or equal to three-times and smaller than or equal to fifteen-times of the equivalent amount to the amount of the metal powder and euqivalent amount to the fuel gas combustion.

In accordance with one preferred construction, the second means supplys the fuel gas in a rate for generating less than or equal to 5000 kcal per 1 kg of refractory material. The preferred supply rate of the fuel gas by the second means is to generate caloric value in a range of 2000 kcal to 4000. The first means includes means for defining a first path establishing communication between the inner nozzle with a source of the mixture for supplying the mixture in the mixture source to the first nozzle, and the first means further comprises a noncombusible gas source connected to the first path for supplying a pressurized non-combusible gas as carrier gas for carrying the mixture. The second means is connected to an intermeidate section of the first path for introducing the fuel gas into the flow of the non-combusible gas and the mixture in the first path.

In the alternative construction, the first means includes means for defining a first path establishing communication between the inner nozzle with a source of the mixture for supplying the mixture in the mixture source to the first nozzle, and the second means is connected to the first path at a position upstream of induction of the mixture for supplying the fuel gas to the first path for carrying the mixture to the first nozzle.

In either case, the fuel gas to be supplied by the second means is a non-oxidation fuel gas.

An apparatus may further comprise fourth means for controlling operation of the first, second third means, the fourth means operating the second and third means in advance of operating the first means for establishing combustion frame for pre-heating the surface of the refractory construction. The fourth means operates the first means to inoperative position to stop supply of the mixture at the end of spray coating operation and maintains the second and third means for a given period after terminating spray coating with gradually reducing fual gas amount in order to gradually cooling-off the surface of the refractory construction.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
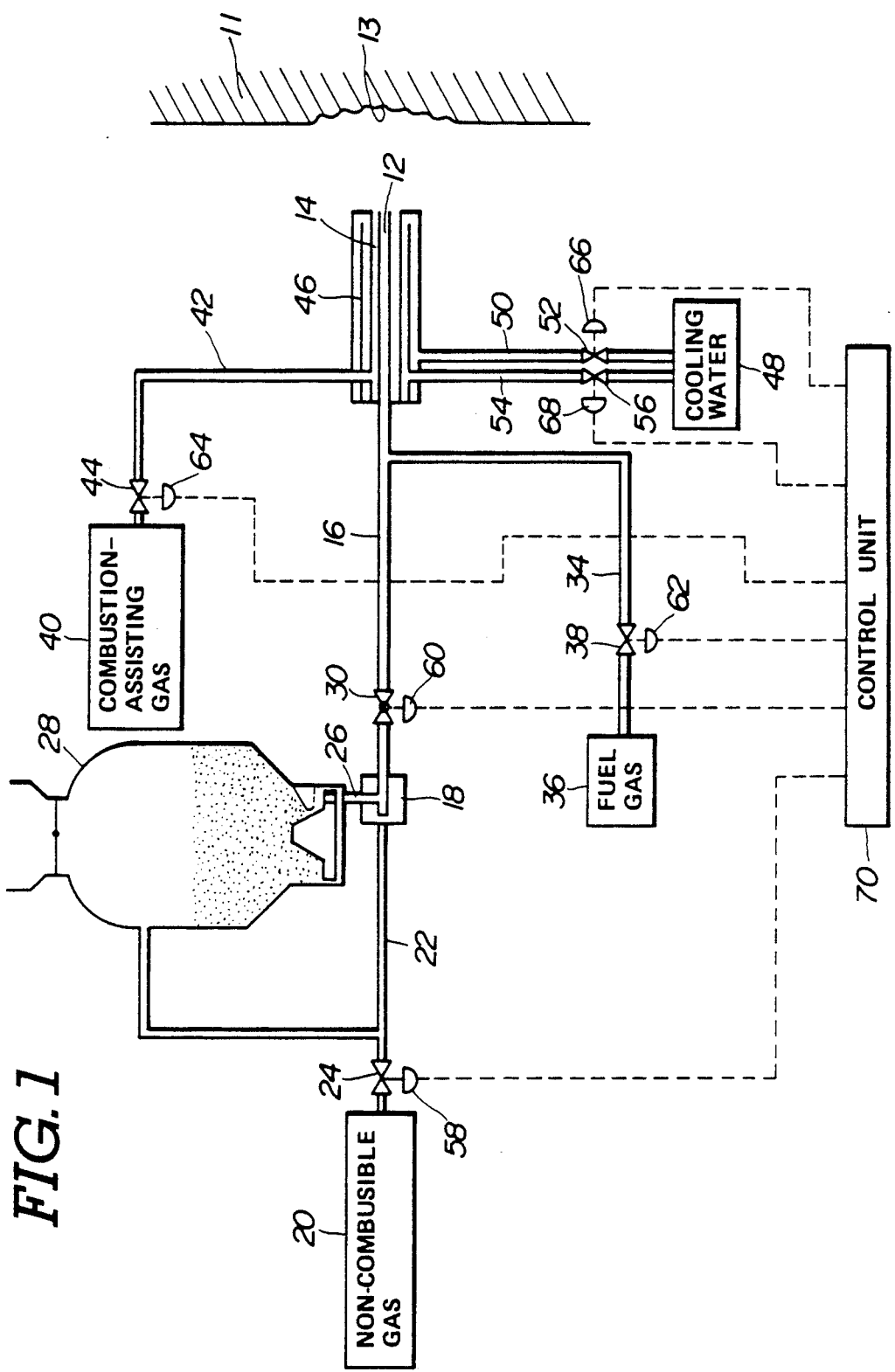
FIG. 1 is a schematic diagramatic illustration showing the preferred embodiment of a spray coating apparatus according to the invention.

Referring now to the drawings, particularly to FIG. 1, the preferred embodiment of a spray coating apparatus, according to the present invention, has a lance 10. The lance 10 has an inner injection nozzle 12 and an outer injection nozzle 14. The inner injection nozzle 12 extends axially along the center axis of the lance 10. On the other hand, the outer injection nozzle 14 is in an annular form and arranged coaxially with the inner injection nozzle 12. The inner and outer injection nozzles 12 and 14 are directed toward the surface of a refractory wall or refractory lining 11. In FIG. 1, the refractory wall 11 is formed a defect 13 on the surface. In order to perform repairing for filling the defect with the refractory material, the inner and outer injection nozzles 12 and 14 of the lance 10 are specifically directed to the defect 13 in order to perform spray coating for filling the defect with the refractory material.

The inner injection nozzle 12 is connected to a refractory material supply line 16, which is connected to an ejector feeder assembly 18 at the end remote from the lance 10. To the ejector feeder assembly, a carrier gas source 20 is connected via a non-combusible gas supply line 22 and a carrier gas flow control valve 24. According to the preferred embodiment of the spray coating apparatus, the carrier gas source 20 is designed to supply a pressurized inert gas or non-combusible gas through the carrier gas supply line 22. On the other hand, the ejector feeder assembly 18 has a suction pipe 26 inserted into a hopper 28 filled with a mixture of a refractory material and a fine particle of powder state combusible metal. A refractory material flow control valve 30 is disposed within the refractory material supply line 16 for blocking communication between the lance 10 and the ejector feeder assembly 18 so as to control supply of refractory material to the inner injection nozzle 12 of the lance 10.

A branch line 32 of the carrier gas supply line 22 is connected to the hopper 28 to introduce therein the inert or non-combusible gas. Also, a fuel gas supply line 34 for supplying a non-oxidating fuel gas, such as propane and the like, is connects the refractory material supply line 16 at upstream of the lance 10 to a fuel gas source 36. A fuel gas flow control valve 38 is disposed in the fuel gas supply line 34 for establishing and blocking communication between the reftactory material supply line 16 and the fuel gas source 36.

The outer injection nozzle 14 is connected to a combustion-assisting gas source 40 via a assisting gas supply line 42 and a assisting gas flow control valve 44 for discharging a oxygen containing combustion-assisting gas, such as oxygen gas, air and the like. The assisting gas flow control valve 44 establishes and blocks communication between the combustion-assisting gas source 40 and the outer injection nozzle 14 of the lance 14.

A cooling water passage 46 is defined within the peripheral wall of the lance 10 or sorrounding the outer injection nozzle 14. The cooling water passage 46 is connected to a cooling water source 48 via cooling water supply line 50 and a cooling water supply control valve 52. A drain line 54 with a drain control valve 56 is also disposed between the cooling water passage 46 and the cooling water source 48. Therefore, the cooling water supplied from the cooling water source 48 is circulated through the cooling water passage 46 for cooling the lance 10.

The carrier gas flow control valve 24, the refractory material flow control valve 30, the fuel gas flow control valve, the assisting gas flow control valve, the cooling water supply control valve 52 and the drain control valve 56 are respectively associated with electrically operable actuators 58, 60, 62, 64, 66 and 68. Respective actuators 58, 60, 62, 64, 66 and 68 are controlled by control signals produced by a control unit 70.

In the shown embodiment, the $N_2$ gas is used as the non-combusible carrier gas. As a fuel gas, propane gas, acetylene gas and so forth can be used. On the other hand, as the combustion-assisting gas, oxygen or atmospheric air as oxygen containing gas is used.

The refractory material is selected among silica, almina, mullite, chamotte, zilcon, zilconia, magnesia, magnesite-chrome and so forth, or the combination thereof. The refractory material is selected from the above, according to the composition of the refractory wall 11 to be treated. The metal to be mixed with the refractory material set forth above is selected among, aluminium, metal silicon and the combination thereof. Also, Mg, Mn, FeMn, SiMn, CaSi, FeSi, FeCr, $CaC_2$ and the combinations thereof can be used as metal.

Figure 2:
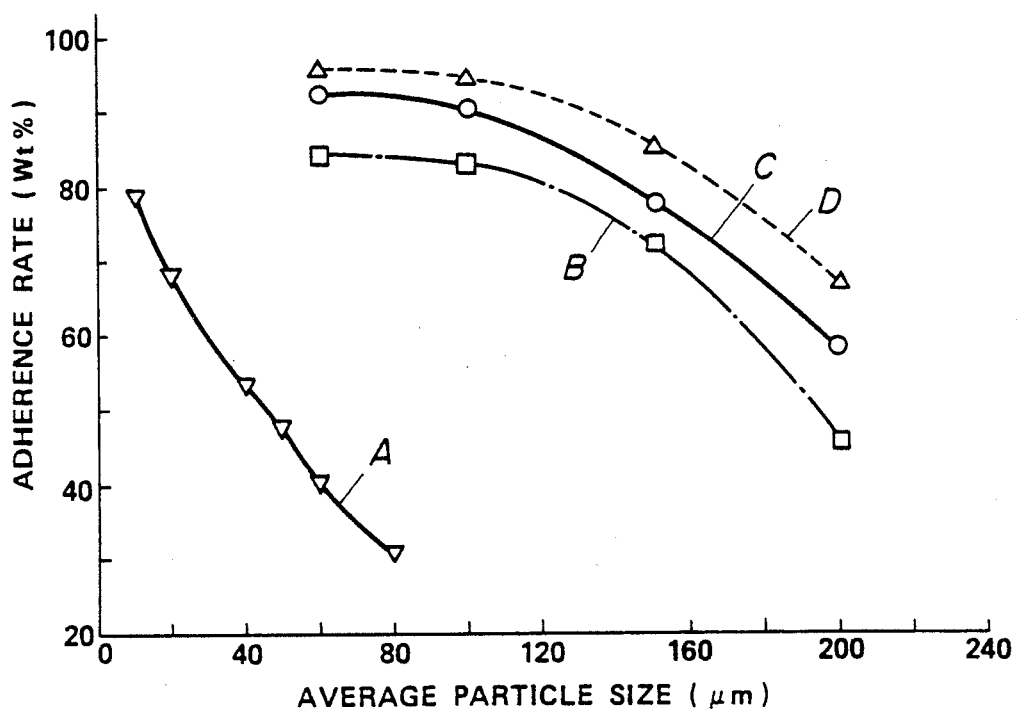
FIG. 2 is a graph showing a relationship between a refractory layer adhering efficiency and average particle size of a metal particle to be mixed with a refractory material.

As set forth, when the metal powder in the average particle size less than 50 $\mu$m in diameter, the combusibility of the metal powder is substanmtially high to be easily combustioned. This requires substantially careful attention in transportation and in spray coating operation so as to avoid danger in accidental combustion or back-firing. Even when the substantially high attention is paid, the operator may still be subject to danger. In view of safety in handling and operation, the average particle size of the metal powder has to be greater than 50 $\mu$m. On the other hand, in the shown apparatus, the metal powder is carried with the refractory material by means of the non-combusible gas flow. Therefore, the maximum size of the metal particle is limited in view of the flow velocity and pressure of the non-combusible gas as the carrier gas. Furthermore, as is well known, the larger particle size metal powder has lower combusibility. Therefore, if the average particle size of the metal powder becomes excessively large, it will cause difficulty in generating satisfactory combustion during spray coating operation. This, in turn, means that the adherence ability of the refractory layer to be formed by the spray coating will be differentiated depending upon the average particle size of the metal powder. FIG. 2 shows variation of the adhering ability with respect to various average particle sizes of the metal powder. It should be noted that FIG. 2 shows a result of experimentation take place utilizing powder state aluminium as the material of combusible metal. In the experimentation, propane gas is utilized for supplying various caloric values by combustion thereof. Namely, amount of the propane gas is adjusted to provide caloric values 0 kcal, 2000 kcal, 3000 kcal and 4000 for kg of the mixture of the refractory material and the metal particle. In the mixture, 15% by weight of the metal powder, i.e. aluminium powder, is contained. In FIG. 2, line A shows the variation of the adherence ability (Wt %) of the refractory layer established when the amount of propane is adjusted to provide 0 kcal of caloric value. Likewise, lines B, C and D respectively show adherence ability at 2000 kcal, 3000 kcal and 4000 supplied by combustion of the propane gas.

As observed from FIG. 2, when 3000 kcal of caloric value is supplied, relatively high adherence ability was obtained when the average particle size of the aluminium powderle is less than or equal to 160 $\mu$m. Namely, the adherence ability at the average particle size 160 $\mu$m of the aluminium particle with providing the 3000 kcal of calory corresponds to that of the particle size 20 $\mu$m of the alminium powder provided no calory. Therefore, in view of the result of experimentation set forth above, the maximum average size of the metal powder is preferred at the average size less than or equal to 160 $\mu$m.

Figure 3:
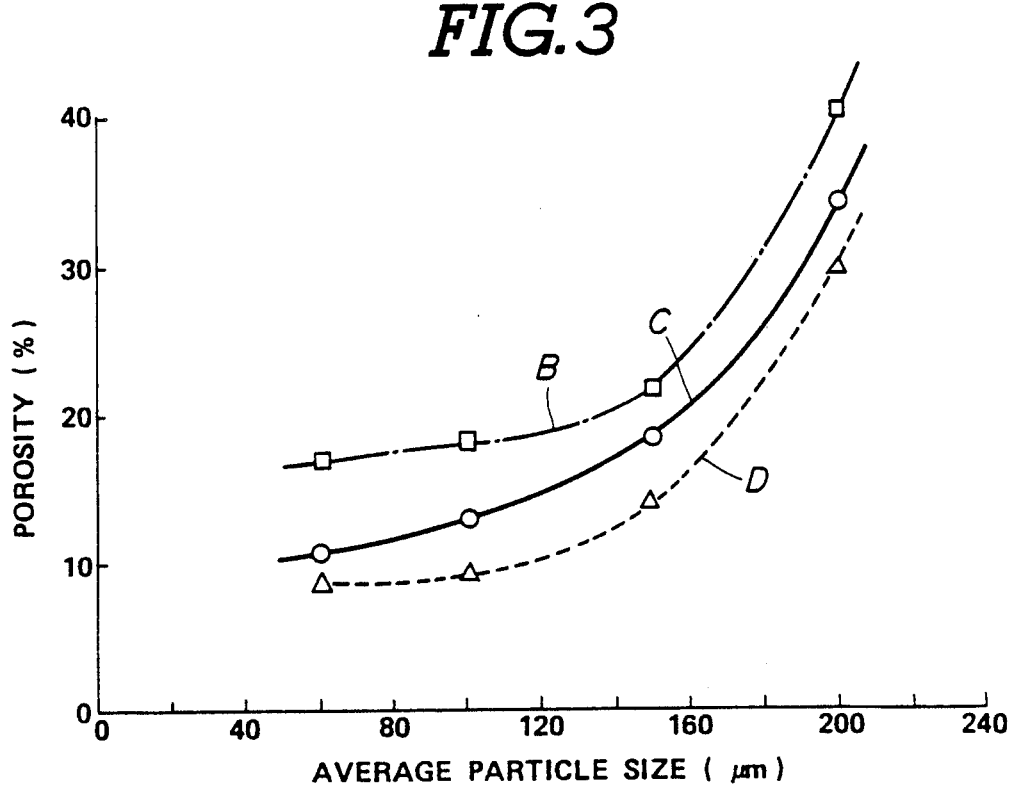
FIG. 3 is a graph showing relationship between porosity in the refractory layer established and the average particle size of the metal particle contained in the mixture.

FIG. 3 shows porosity in the refractory layer formed in the experimentation set forth above. In FIG. 3, the lines A, B, C and D respectively show porosity of the refractory layer formed by spray coating operations with providing calory of 0 kcal, 2000 kcal, 3000 kcal and 4000 kcal by combustion of the propane gas. As observed from FIG. 3, while the average particle size in diameter of the aluminium powder is held smaller than or equal to 160 $\mu$m, the porosity is maintained less than or equal to 20%. In view of this, the particle size of the metal powder is also preferred at the average size less than or equal to 160 $\mu$m. In further observation in FIG. 3, it would be appreciated that it would be more preferable to limit the range of average particle size of the metal powder in diameter less than or equal to 140 $\mu$m. Therefore, in view of the preferred porosity, it would be appreciated that it is more preferabe to limit the range of the average metal particle size is 70 $\mu$m to 140 $\mu$m.

Figure 4:
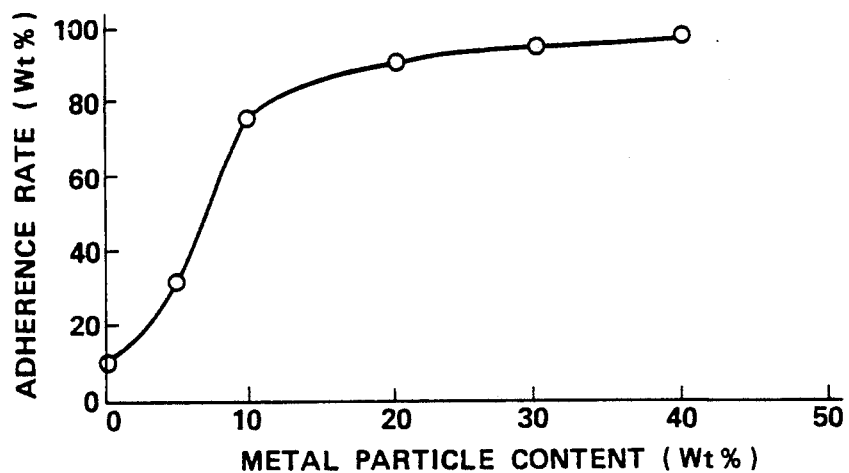
FIG. 4 is a graph showing a relationship between a refractory layer adhering efficiency and a concentration of the metal particle in a mixture of the refractory material and the particle metal.

FIG. 4 shows variation of adherence ability of the refractory layer formed by spray coating in relation to the content of the metal powder. In order to find an optimum content of the metal powder in the mixture of the refractory material and the metal powder, an experimetation was performed. For this experimentation, the average particle size 80 $\mu$m in diameter of the aluminium powder is utilzed to be mixed with the refractory material. For experimental spray coating operation, supply calory was adjusted at 1000 kcal.

As seen from FIG. 4, the adherence ability is icnreased at substantially high rate according of increasing of the content of the aluminium powder upto 10 Wt %. After reaching 10 Wt %, increasing rate of the adherence ability is substantially lowered. In view of the result of experimentation as shown in FIG. 4, it will be appreciated that satisfactory adherence can be obtained when the content of the metal powder is greater than or equal to 10 Wt %. On the other hand, as will be naturally understood, increasing of the amount of the metal powder increases the cost of spray coating. Therefore, in view of the cost-vs-performance, the preferred range of metal powder content is in a range of 10 Wt % to 30 Wt %.

Figure 5:
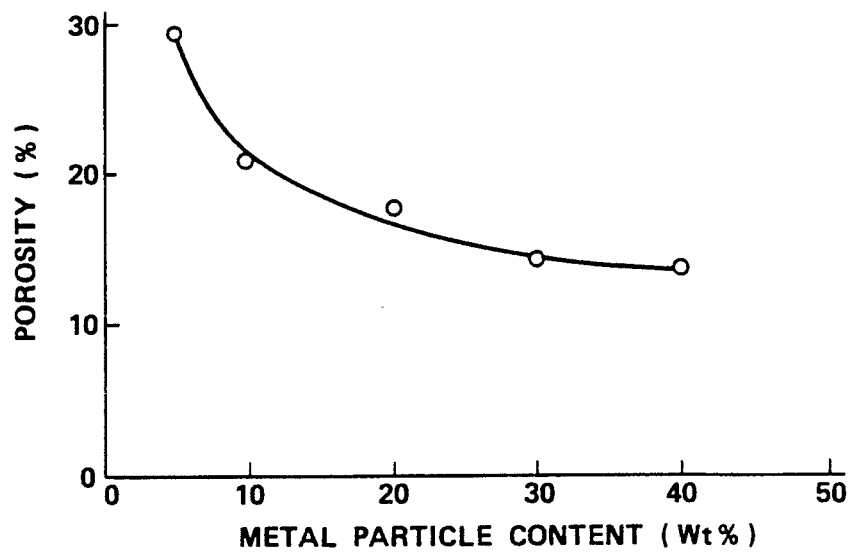
FIG. 5 is a graph showing relationship between porosity and amount of the metal particle in the refractory material mixture.

FIG. 5 shows variation of porosity in the refractory layer formed by spray coating with various content of the metal powder. As seen from the graph of FIG. 5, the porosity is held lower than or equal to 20% when the content of the metal powder in the refractory material mixture is in a range of 10% to 30% by weight. This may confirm that the content of the metal particle in the range of 10 Wt % to 30 Wt % is preferred. In the further obsevation, it is appreciated that when the content of the metal powder in the mixture of the refractory material and the metal powder is higher than about 15 Wt %, the porosity becomes less than or equal to 10%. In additionally considering the cost-vs-performance, the further preferred range of the content of the metal powder is in a range of 13 WT % to 20 WT %.

As will be appreciated, it is preferable to completely combustion the metal powder to generate caloric value sufficient for melting or half-melting the refractory material and to convert the combusible metal into refractory metal oxide. The particles of metal oxide in a melt or hald-melt state coat the outer periphery of the refractory material which is also in melt or half-melt state. In order to obtain complete combustion of the combusible metal particle, sufficient amount of combustion-assisting gas, such as oxygen, air and so forth, is required.

In order to determine the supply ratio of the combustion-assisting gas, an experimentation is performed. In the experimentation, alumina refractory which has a composition of 85 Wt % of $Al_2O_3$, 10 Wt % of $SiO_2$ and remainders of $Fe_2O_3$, CaO. The alumina refractory is mixed with aluminium particle having an average particle size of 100 $\mu$m. The aluminium particle is contained in the refractory material mixture in a rate of 10% by weight. As the combustion-assisting gas, oxygen was used and as the fuel gas, propane was used. Amount of propane was adjusted to generate 3500 kcal of caloric value in total including caloric value generated by combustion of the aluminium powder.

Figure 6:
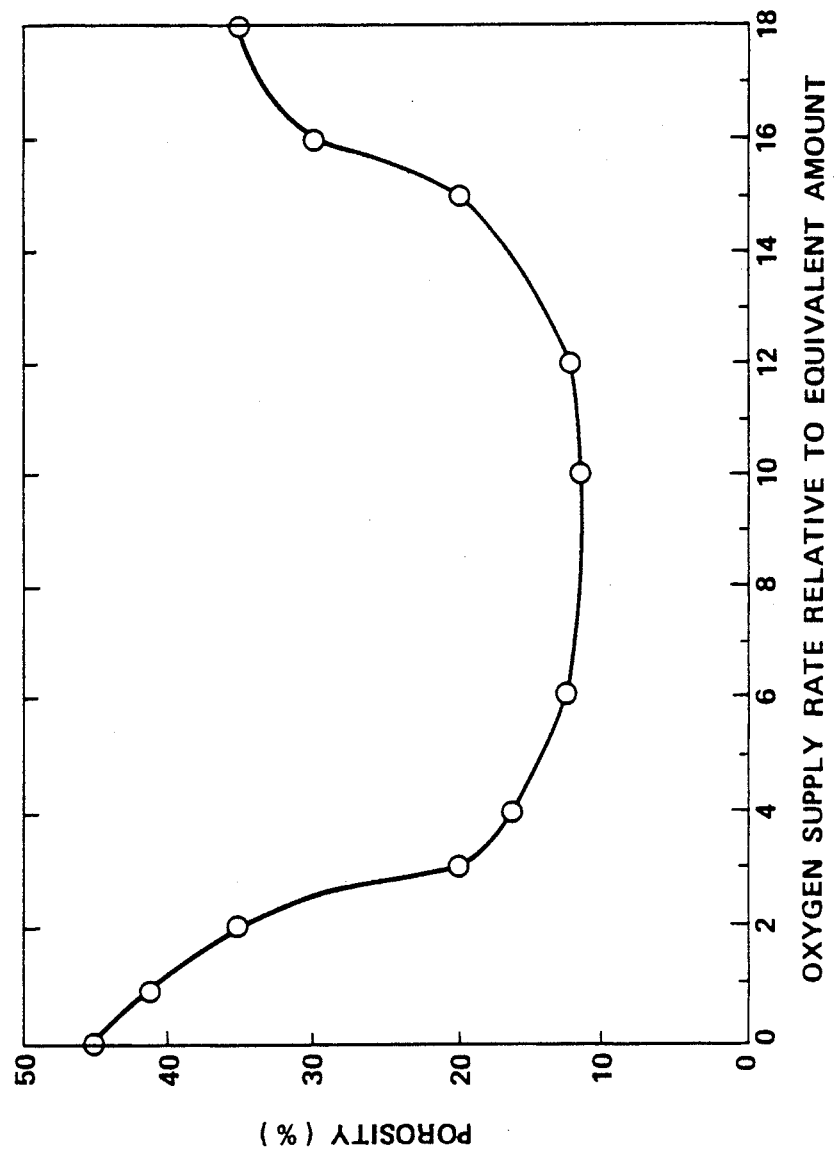
FIG. 6 is a graph showing relationship between porosity in the established refractory layer and oxygen supply rate.

The graph in FIG. 6 shows variation of the porosity in the refractory layer formed in the experimentation in relation to the oxygen supply ratio relative to the theoritical equivalent amount of oxygen for oxidation of the aluminium powder. It should be noted that equivalent amount of oxygen for combustion of propane gas was neglected from the value in the graph.

As observed from FIG. 6, porosity of the refractory layer formed in the aforementioned experimentation is held less than or equal to 20% when the supply rate of the oxygen is three-times or more of the theoritical equivalent amount. The porosity of the refractory layer can be held lower than or equal to 20% as increasing the oxygen supply rate upto fifteen-times of the theoritical equivalent. When the oxygen supply rate exceeds fifteen-times of the theoritical equivalent, the porosity again increases. As will be appreciated herefrom, the oxygen supply rate is preferably in a range of three-times to fifteen times of the equivalent amount relative to the amount of the aluminium powder in the refractory material mixture. As will be further seen from FIG.

6, the further preferable oxygen supply rate is four-times to fifteen times of the theoritical equivalent.

On the other hand, as will be easily appreciated, the adherence ability of the refractory layer to be formed is variable depending upon the magnitude of melting of the refractory material. The melting magnitude of the refractory material will be increased by increasing the caloric value to be provided thereto. Therefore, in order to satisfactorily melt the refractory material, sufficient amount of fuel gas to generate sufficient caloric value, has to be supplied. As set forth, in order to obtain satisfactory melting magnitude, 5000 kcal to 8000 kcal of caloric value is required in the prior art as set forth above. This requires large amount of fuel gas to make the spray coating expensive.

According to the present invention, since the additional caloric value is provided by combustion of the metal powder, required fuel amount can be reduced. In the present invention, the fuel gas amount to be supplied in the spray coating operation is set for providing less than or equal to 5000 kcal of caloric value during combustion for 1 kg of refractory material. More preferable range of caloric value to be generated by combustion of the fuel gas is 2000 kcal to 4000 kcal per 1 kg of refractory material. By providing such reduced amount of fuel gas, the caloric value to be generated in combustion of the fuel gas in the frame become insufficient to cause melting of the refractory material. Therefore, the refractory material discharged through the lance 10 will be merely heated to be easily melted by providing additional calory.

In observation of the process of formation of the refractory layer according to the invention, it was found that the not molten particles of refractory material contact onto the surface of the reflractory construction to be treated, with the combustioning particles of metal powder. On the surface of the refractory construction, the metal powder particles contiune combustion to directly transmit the combustioning calory to the refractory material. Calory transmission efficiency from the combustioning metal to the refractory material is much higher than that transmitted from the combustioning gas to the refractory maetrial. As a result, the retractory material on the surface of the refractory construction melts and/or half-melts to successfully adhere on the associated surface of the refractory construction.

Figure 8:
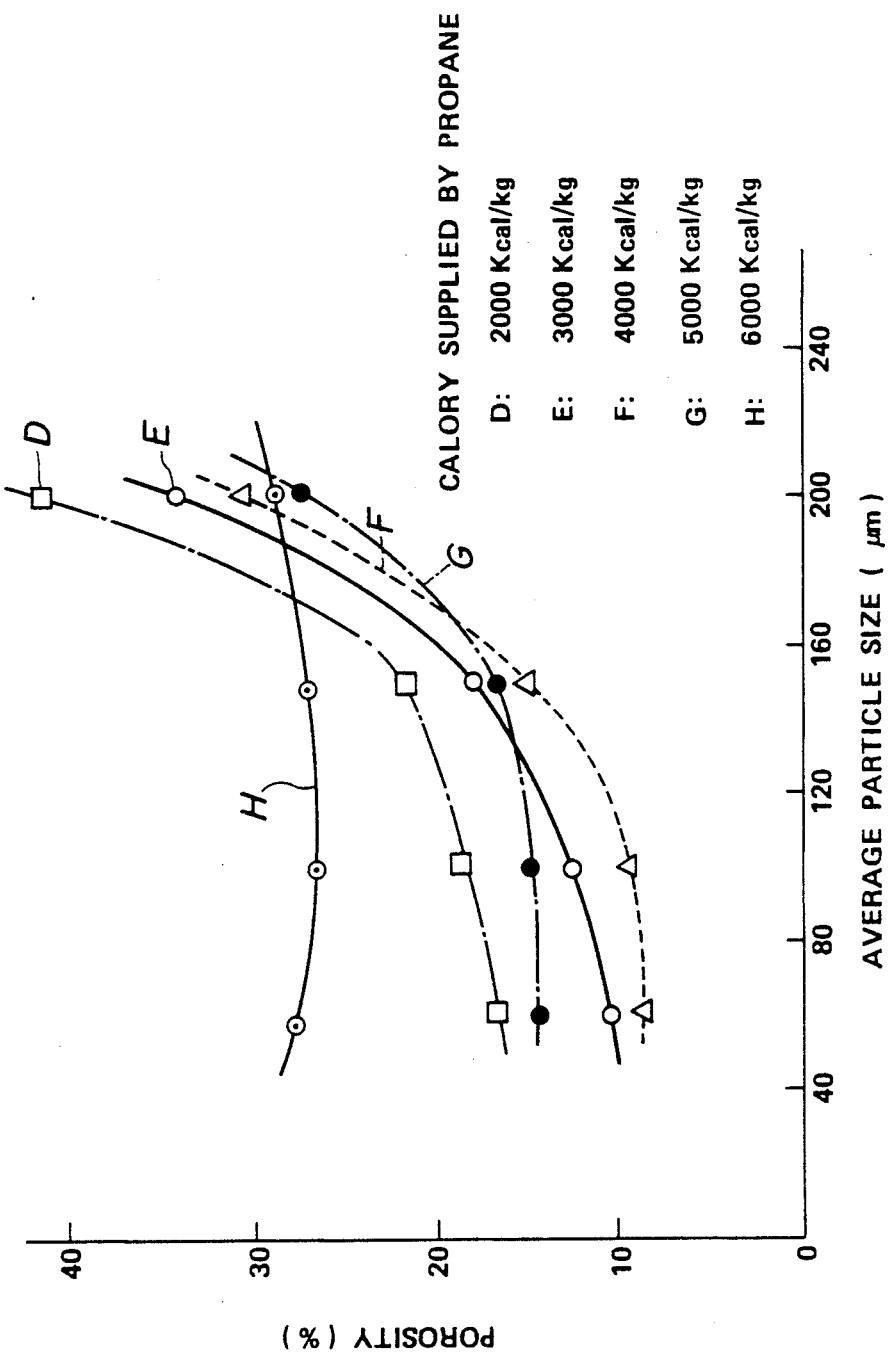
FIG. 8 is graph showing relationship between porosity and average particle size of the refractory article to be utilized in the preferred embodimenr of FIG. 1.

If the caloric value sufficient for melting and/or half-melting the refractory material in the combustioning frame is provided, part of the molten refractory material adheres onto the internal periphery of the inner nozzle of the lance to cause variation of the path area of the nozzle. This causes fluctuation of the injection rate of the refractory material, the metal powder and the fuel gas to vary performcance of the spray coating. This will be seen from lines G and H in FIG. 8. The lines G and H are obtained from the experimentation set forth above by providing 5000 kcal and 6000 kcal of caloric value.

As will be clear herefrom, the preferred range of the fuel gas supply amount in the present invention is to generate less than or equal to 5000 kcal, and more preferably 2000 kcal to 4000 kcal.

Returning to FIG. 1, the practical spray coating operation to be taken place by the preferred embodiment of the spay coating apparatus according to the invention will be disclosed herebelow.

In order to prevent the refractory wall from causing spalling, it would be preferable to gradually and moderately heat the refractory wall in advance of performing spray coating. Therefore, control unit 70 feeds the control signals to the actuators 62 and 64. As a result, the actuators 62 and 64 become active to open the aasociated fuel gas supply control valve 38 and the assisting gas supply control valve 44. Therefore, the fuel gas source 36 and the combustion-assisting gas source 40 are connected to the inner and outer injection nozzles 12 and 14 Of the lance 10. Since the lance 10 is inserted into the substantially high temperature atmospher in the coke oven, kiln, furnace or so forth, the fuel gas is burnt or combustioned to establish a frame directed toward the defect 13 on the refractory wall 11. By the frame established as set forth above, the portion of the refractory wall 11 to be treated is heated beforehand of starting spray coating.

Subsequently, the control signal is transmitted to the actuator 58 to open the carrier gas flow control valve 24 to establish communication between the carrier gas source 20 and the ejector feeder assembly 18. By opening of the carrier gas flow control valve 24, the pressurized non-combusible carrier gas is introduced into the hopper 28 to increase the internal pressure of the hopper. After the pressure in the hopper reaches a predetermined value, the control signal is fed to the actuator 60 to open the refractory material flow control valve 30. Therefore, pressurized carrier gas starts to flow through the ejector feeder assembly 18 and the refractory material supply line 16. During passing of the non-combusible carrier gas through the ejector feeder assembly 18, the mixture of the refractory material and the metal powder is drawn into the ejector feeder assembly and transferred through the refractory material supply line 16. Therefore, the refractory material mixture flows through the reftractory material supply line. Since the fuel gas is introduced into the refractory material supply line 16 at the position downstream of the refractory material flow control valve 30 and upstream of the inner injection nozzle 12 of the lance, a combusible mixture of the refractory material, the combusible metal powder and the fuel gas is established. The combusible mixutre containing the fuel gas is transferred into the inner injection nozzle. Upon injected from the end of the inner injection nozzle 12, the refractory material mixture and the fuel gas subject substantially high atmospher to establish combustion.

At the same time, the combustion-assisting gas is discharged through the end of the outer injection nozzle 14 around the frame established by combustion of the metal powder in the reflactory material mixture and the fuel gas. By the presence of the combustion-assisting gas, combustioning frame propagrates. The refractory material with combustioning metal powder contacts onto the surface of the refractory wall 11, on which the defect 13 is formed. At this time, the metal oxide as a resultant of the combustion may also serve as the refractory material and mixed with the refractory material. This increases density of the refractory material to increase the density of the reflactory layer formed by the spray coating.

After completing required spray coating operation, the control signals are transmitted to the actuators 58 and 60 to close the carrier gas flow control valve 24 and the refractory material flow control valve 30. As a result, supply of refractory material is shut. At this time, since the fuel gas flow control valve 38 and the assisting gas flow control valve 44 are kept open, combustion of the fuel gas is maintained to enable to gradually and moderately cool off the refractory wall. This successfully prevent the refractory wall from causing spalling.

EXAMPLE I

Utilizing the preferred embodiment of the spray coating appratus of FIG. 1, the repair is performed for fire blick construction around a tuyere of a hot metal ladle having hot metal receiving capacity of 100 t. The fire blick was made of high almina material. Repairing operation is performed by spray coating by injecting mixture of the refractory material and the metal particle in amount of 60 kg/h. The flow of the combustion-assiting gas, i.e. oxygen flow, is established around the mixture injected.

Alminium powder was used as the combusible metal component of the mixture. Maximum particle size of the aluminium powder was 120 $\mu$m and the average particle size was 80 $\mu$m. This aluminium powder was mixed with a alumina refractories having maximum average particle size of 500 $\mu$m. The alumina refractories has a composition of 87 Wt % of $Al_2O_3$ and remainders is constituted of $SiO_2$, $CaO$, $Fe_2O_3$. The aluminium powder and alumina refractories were mixed at a mixture ratio of 20:80 by weight.

The wall of the ladle to be repaired was previously heated by a frame established by combustion of propane gas ($C_3H_8$) as the fuel gas, at a temperature of 1400° C. After the wall temperature reaches about 1400° C., the mixture was introduced into the lance for injection with $N_2$ gas as the non-combisible carrier gas. To the flow of the mixture and $N_2$ gas, the propane gas is introduced in amont of 6.0 m$^3$/h. The combustion-assisting gas, i.e. oxygen, is also discharged around the mixture injected. The discharge rate of the combustion-assisting gas was set at 37.5 m$^3$/h. Spray coating operation was continued for about 10 minutes. As a result, satisfactory refractory layer could be formed on the fire blick. Spalling was not observed in the fire blick. Furthermore, as observed the established refractory layer, the layer was firmly adhered on the fire blick.

After completing the aforementioned repairing operation, the hot metal ladle thus repaired was used to receive 100 t of hot metal at the temperature of 1650° C. The received hot metal was transported to a station where continuous casting is performed and poured into a continuous caster from the ladle. The repaired ladle could be used for 6 heats of the foregoing operations.

EXAMPLE II

Figure 7:
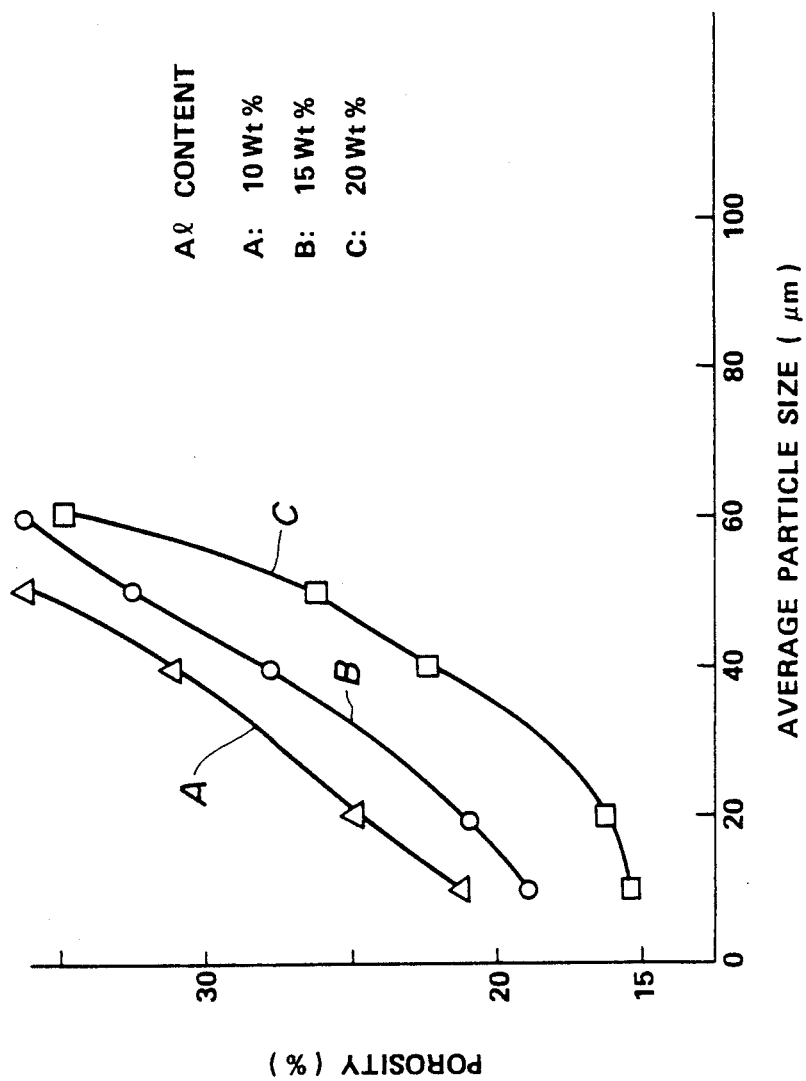
FIG. 7 is a graph showing relationship betweeen porosity and average particle size of the metal particle when combustioning gas is not supplied.

In order to compare the efficiency and performance of the spray coating according to the invention, comparative experimentation was performed. The comparative experimetation has been performed without supplying the combustion-assisting gas, such as oxygen or air, according to the process set out in the Japanese Patent Second Pulication 49-46364. FIG. 7 shows variation of porosity of the refractory layer formed during the comparative experimentation. Content of alimunium powder was varied in various samples to the rates of 10 Wt %, 15 Wt % and 20 Wt %. As will be seen from FIG. 7, porosity of the refractory layer becomes smaller as decreasing the average particle size of the aluminium powder to be contained in the refractory material mixture.

In the observation of the line B which is derived from samples containing 15 Wt % of aluminium powder, the average particle size of less than or equal to 20 $\mu$m is required for obtaining the refractory layer having a porosity less than or equal to 20%.

In order to compare with this, another experimentation was performed with supplying oxygen as the combustion-assisting gas utilizing the spray coating appratus of FIG. 1. In the experimentation, propane gas was used as the fuel gas. Supply amount of propane was adjusted to supply different caloric values, e.g. 2000 kcal/kg, 3000 kcal/kg and 4000 kcal/kg. 10 Wt % of aluminium powder was contained in the refractory material mixture. As will be seen from FIG. 8, in this case, the porosity of the refractory layer formed in the experimentation could be maintained less than or equal to 20%, when the average particle size of the aluminium powder was in a range of 40 $\mu$m to 160 $\mu$m.

This confirms that, in the spray coating method as proposed in the present invention, greater average particule size of metal powder can be used for performing spray coating without causing siginificant difference to that obtained in the conventional process utilizing substantially small particle size of metal powder. Therefore, the present invention assures safety spray coating operation.

In addition, according to the ivnention, since the metal particle is carried by non-combusible carrier gas, combustion of the metal powder within the refractory material supply line can be successfully prevented.

Though the foregoing preferred embodiment of the spray coating apparatus of FIG. 1, employs the inert and/or non-combusible gas as carrier gas for transporting the powder state mixture of the refractory material and the metal powder, it would be possible to carry the mixture with any non-oxidation gas. Namely, the fuel gas, such as propane gas, can be used for transporting the powder state mixture. Therefore, the appratus of FIG. 1 can be modified as shown in FIGS. 9 and 10.

Figure 9:
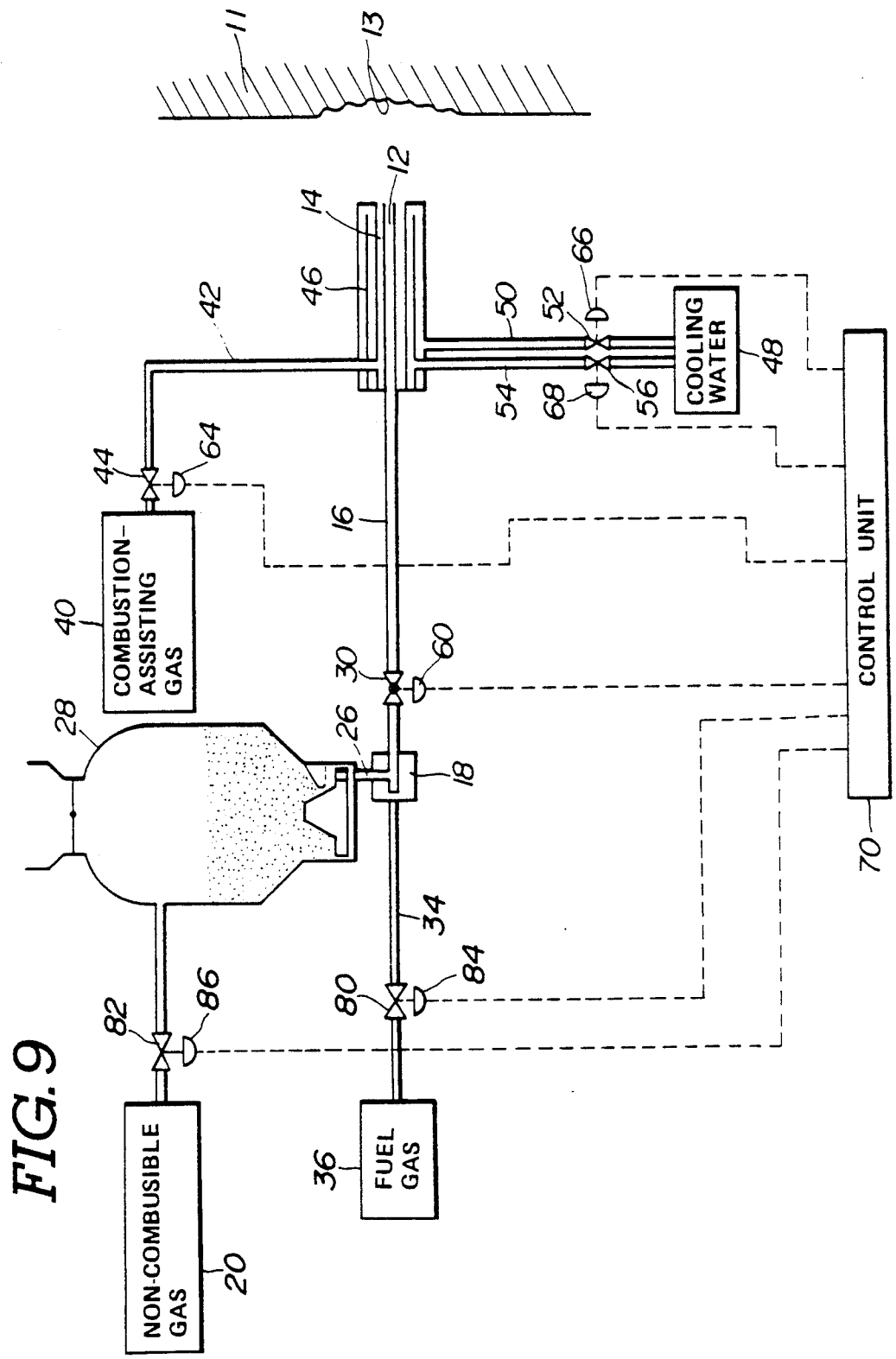
FIG. 9 is a schematic and diagramatic illustration showing a modification of the preferred embodiment of the spray coating apparatus of FIG. 1.

In a modification of FIG. 9, the ejector feeder assembly 18 is connected to a fuel gas source 36 via a fuel gas supply control valve 80. The non-combusible gas source 20 is connected to the internal space of the hopper 28 via the non-combusible gas flow control valve 82. The fuel gas supply control valve 80 and the non-combusible gas flow control valve 82 are respectively associated with valve actuators 84 and 86 which are, in turn, connected to the control 70. Other construction of the modification of FIG. 9 is identical to that illustrated in FIG. 1. Therefore, the disclosure for respective feature in the common construction is neglected in order to keep the recitation concise enough to avoid unnecessary confusion.

In the shown construction, the non-combusible gas is introduced from the non-combusible gas source into the hopper 28 to pressurize the mixture of the refractory material and the metal powder in the hopper 28. On the other hand, the fuel gas is supplied to the ejector feeder assembly 18 from the fuel gas source 36 for drawing the mixture in the hopper to the refractory material supply line 16. By introducing the mixture in the refractory material supply line 16, a combusible mixture of the refractory material, the metal powder and the fuel gas is established. Therefore, the refractory material and the metal powder are carried by the fuel gas flow to the inner nozzle 12 of the lance 10.

Figure 10:
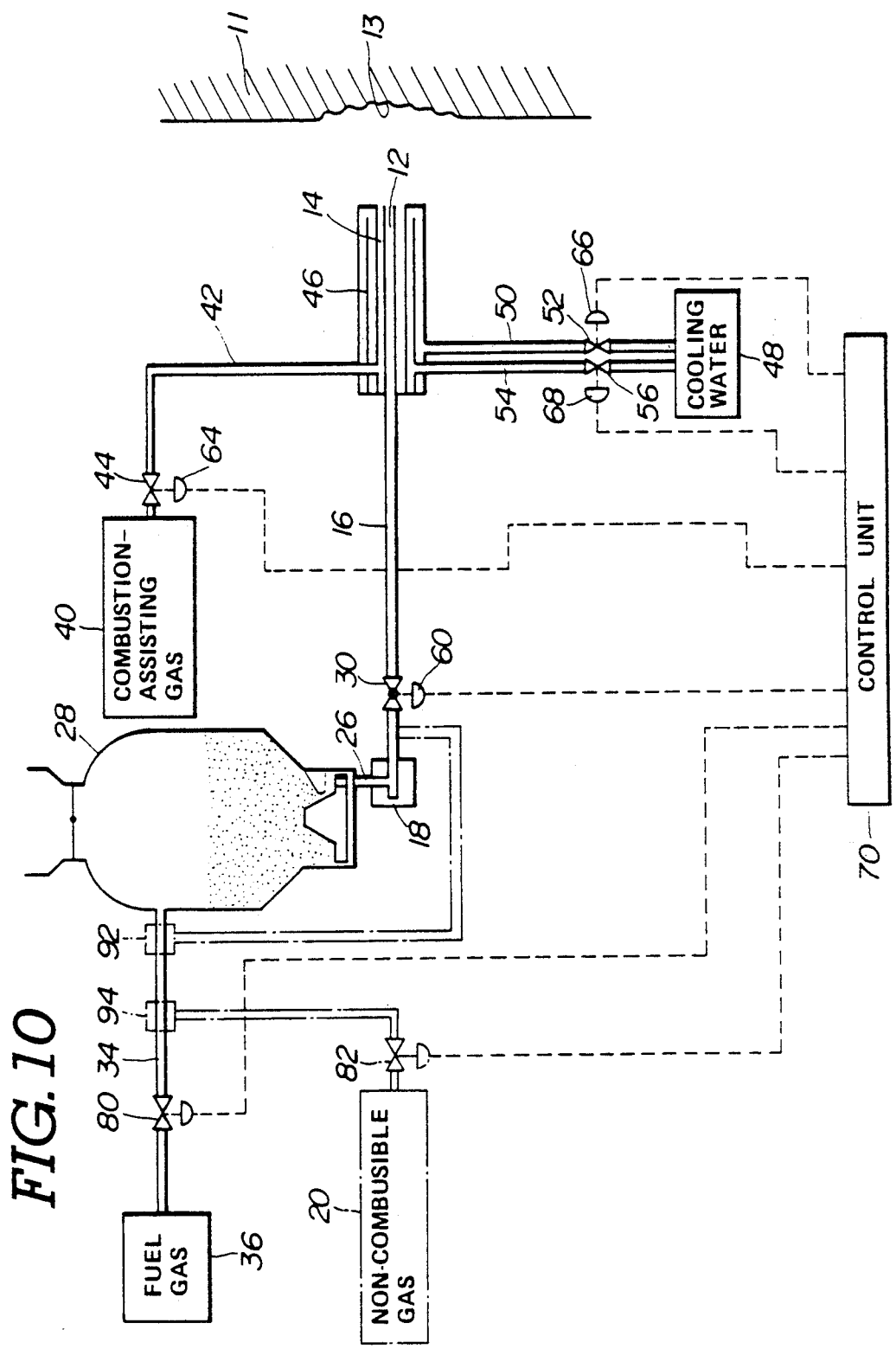
FIG. 10 is a schematic and diagramatix illustration showing another modification of the preferred embodiment of the spray coating apparatus of FIG. 1.

On the other hand, in another modification in FIG. 10, the fuel gas source 36 is connected to the hopper via the fuel gas supply control valve 80. Therefore, in this arrangement, the combusible mixture is established in the hopper 28 and forced to flow through the refractory material supply line 16 by the pressure in the hopper.

In this case, a brantch passage 90 as shown by phantom line is provided for connecting the refractory material supply line 16 and the fuel gas source 36 via three-way valve 92 so that combustioning frame of solely the fuel gas can be established for moderately warming-up and cooling-off the surface to be treated before and after spray coating operation. With the foregoing construction, the three-way valve may connect the fuel gas source to the refractory material supply line via the branch passage while the spray coating is not performed so that the fuel gas can be directly supplied to the inner nozzle. On the other hand, when spray coating is to be performed, the valve position of the three-way valve may be switched to connect the fuel gas source to the hopper. Furthermore, so that the fuel gas in the appratus can be safely removed when the refractory material and/or metal powder to be used are to be changed, an inert or non-combusible gas source is connected to the fuel gas passage connecting the fuel gas source and the hopper, as illustrated by the phantom line in FIG. 10. In this case, a three-way valve 94 may also be provided for selectively connecting the hopper to the fuel gas source and the non-combusible gas source 20.

It should be appreciated that, in both modifications set forth above, it is essential to use a fuel gas which does not contain oxygen so as to avoid danger of accidental combustion of the metal powder.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. An apparatus for spray coating a refractory material onto a refractory construction comprising:
   a lance containing first and second nozzles;
   a source of combustible fuel gas;
   a source of combustion assist gas;
   a source of particulate refractory material;
   a source of particulate combustible metal wherein the size of said combustible metal particles is within the range of 50 $\mu$m to 160 $\mu$m;
   first means for feeding said particulate refractory matter and said particulate metal through said first nozzle, said first means including means for defining a first path establishing communication between said inner nozzle and a source of said mixture for supplying said mixture in said mixture source to said first nozzle, and said first means further comprising a non-combustible gas source connected to said first path for supplying a pressurized non-combustible gas as a carrier gas for carrying said mixture;
   second means for feeding said fuel gas through said first nozzle; and
   third means for feeding said combustion assist gas through said second nozzle for supplying oxygen necessary for combustion of said fuel gas and said combustible metal.

2. An apparatus for spray coating as set forth in claim 1, wherein said second means is connected to an intermediate section of said first path for introducing said fuel gas into the flow of said non-combustible gas and said mixture in said first path.

* * * * *

UNITED STATES PATENT AND TRADEMARK OFFICE
CERTIFICATE OF CORRECTION

PATENT NO. : 5,061,527
DATED : October 29, 1991
INVENTOR(S) : Seiji Watanabe et al Page 1 of 16

It is certified that error appears in the above-indentified patent and that said Letters Patent is hereby corrected as shown below:

In Column 1, line 14, please delete "a";
    line 17, please change "technic" to --technique--;
    line 19, please change "combusible" to --combustible--;
    line 26, please change "tear" to --tears--;
    line 27, please change "defect, crack" to --defects, cracks--;
    line 28, please delete "the" and please change "oven" to --ovens--;
    line 29, please change "brust furnace" to --blast furnaces--;
    line 34, please delete "been";
    line 39, please change "to", first occurrence, to --as--;
    line 41, please change "combusible" to --combustible--;
    line 43, after "powder", please insert --is--;
    line 49, please change "a" to --the--;
    line 54, please change "pf" to --of--;
    line 61, please change "particle" to --particles--;
    line 62, please change "particle" to --particles-- and please change "serves" to --serve--; and
    bridging lines 62 and 63, please change "combustioning" to --combustion--.

In Column 2, line 1, after "of", please insert --a--;
    line 3, please change "reflactory" to --refractory--;
    line 4, after "increase", please insert --the--;
    line 8, please change "cause increasing", to --causes increase--;

UNITED STATES PATENT AND TRADEMARK OFFICE
CERTIFICATE OF CORRECTION

PATENT NO. : 5,061,527
DATED : October 29, 1991
INVENTOR(S) : Seiji Watanabe et al It is certified that error appears in the above-indentified patent and that said Letters Patent is hereby corrected as shown below:

line 10, please change "the" to --to a-- and please change "in" to --or--;
    line 13, please change "to", first occurrence, to --in a--;
    line 14, please change "combusibility" to --combustibility-- and please change "particle" to --particles--;
    line 17, please change "calory" to --calories-- and please change "is" to --are--;
    line 18, please change "particle" to --particles--;
    line 22, please change "heating" to --heated--;
    line 33, please change "appratus" to --apparatus--;
    line 35, please change "great particle size metal" to --large size metal particles--;
    line 37, please change "o" to --of--;
    line 38, please change "appratus" to --apparatus--;
    line 39, please change "frame" to --flame--;
    bridging lines 47 and 48, please change "powder state combusible metal." to --combustible metal powder.--;
    line 48, please change "particle" to --particles--;
    line 53, please delete "the", first occurrence;
    line 54, please change "non-combusible" to --non-combustible--;
    line 55, please change "non-oxidation" to --non-oxidizing--;
    bridging lines 58 and 59, please change "combustioning frame" to --combustion flame--;
    line 61, please change "frame" to --flame--;

UNITED STATES PATENT AND TRADEMARK OFFICE
CERTIFICATE OF CORRECTION

PATENT NO. : 5,061,527
DATED : October 29, 1991
INVENTOR(S) : Seiji Watanabe et al It is certified that error appears in the above-indentified patent and that said Letters Patent is hereby corrected as shown below:

line 65, please change "be" to --sizes--;
    line 67, please change "combusibility" to --combustibility--; and
    line 68, please delete "particle" and after "metal", please insert --particles--.

In Column 3, line 2, after "compensates", please insert --for decreased--;
    bridging lines 2 and 3, please delete "to be dropped";
    line 5, please change "value" to --values--;
    line 6, please change "frame" to --flame-- and please change "combustioning" to --combustion--;
    line 11, please change "frame" to --flame--;
    line 13, please change "to form" to --one to form a-- and please delete "of";
    line 17, please change "reflactory" to --refractory-- and please delete "a", second occurrence;
    line 20, please change "combusible" to --combustible--;
    line 28, please change "combusible" to --combustible--;
    line 31, please change "reflactory" to --refractory--;
    line 33, please delete "a", third occurrence;
    line 34, please change "powder state combusible metal;" to --combustible metal powder;--;
    line 35, please change "non-oxidation" to --non-oxidizing-- and please delete "to";
    line 36, before "discharge", please insert --for--;
    line 41, please change "combustioning frame" to --combustion flame--;

UNITED STATES PATENT AND TRADEMARK OFFICE
CERTIFICATE OF CORRECTION

PATENT NO. : 5,061,527  Page 4 of 16
DATED : October 29, 1991
INVENTOR(S) : Seiji Watanabe et al It is certified that error appears in the above-indentified patent and that said Letters Patent is hereby corrected as shown below:

line 42, please change "combusible" to --combustible-- and after "forming", please insert --a--;
    line 43, please change "combusible" to --combustible--;
    line 45, please change "adjancent" to --adjacent--;
    line 46, please change "arround" to --around--;
    line 47, please change "frame" to --flame--;
    line 48, please change "combusible" to --combustible--;
    line 49, after "In", please insert --a-- and please change "the", second occurrence to --a--;
    bridging lines 49 and 50, please change "combusible" to --combustible--;
    line 50, after "having", please insert --an--;
    line 52, please change "euqal" to --equal--;
    line 54, after "than", please insert --or--;
    line 56, please change "combination" to --combinations--;
    line 57, please change "combusible" to --combustible--;
    line 60, please change "combination" to --combinations--;
    bridging lines 62 and 63, please change "zilcon, zilconia" to --zircon, zirconia--;
    bridging lines 63 and 64, please change "combination" to --combinations--;
    line 65, please delete "in a rate";
    line 66, please delete "in a rate"; and
    line 67, please delete "in".

In Column 4, line 1, please delete "a range";
    line 4, please change "in" to --of--;

UNITED STATES PATENT AND TRADEMARK OFFICE
CERTIFICATE OF CORRECTION

PATENT NO. : 5,061,527
DATED : October 29, 1991
INVENTOR(S) : Seiji Watanabe et al It is certified that error appears in the above-indentified patent and that said Letters Patent is hereby corrected as shown below:

bridging lines 7 and 8, please delete "in a range of supply rage";
line 9, please delete "of";
line 11, please change "euqivalent" to --equivalent--;
line 13, please change "supplys" to -supplies--;
line 22, please change "combusible" to --combustible--;
line 23, please change "non-combusible" to --non-combustible-- and after "as", please insert --a--;
line 25, please change "intermeidate" to --intermediate--;
bridging lines 26 and 27, please change "non-combusible" to --non-combustible--;
line 28, please change "the", first occurrence to --an--;
line 38, please change "An" to --The--;
line 39, after "second", please insert --and--;
line 41, after "establishing", please insert --a--;
line 42, please change "frame" to --flame--;
line 44, after "stop", please insert --the--;
line 45, after "of", please insert --the--;
line 47, after "terminating", please insert --the-- and please change "fual" to --fuel--; and
line 48, please change "cooling-off" to --cool--.

In Column 5, line 18, please change "embodimenr" to --embodiment--;
line 22, please change "diagramatix" to --diagramatic--;
line 39, after "formed", please insert --with--;
line 40, please change "repairing for" to --repair by--;

UNITED STATES PATENT AND TRADEMARK OFFICE
CERTIFICATE OF CORRECTION

PATENT NO. : 5,061,527
DATED : October 29, 1991
INVENTOR(S) : Seiji Watanabe et al It is certified that error appears in the above-indentified patent and that said Letters Patent is hereby corrected as shown below:

line 49, please change "non-combusible" to --non-combustible--;
    line 53, please change "non-combusible" to --non-combustible--;
    line 58, please change "combusible" to --combustible--;
    line 60, after "for", please insert --establishing and--;
    line 66, please change "non-combusible" to --non-combustible--;
    line 67, please change "non-oxidating" to --non-oxidizing--; and
    line 68, please change "connects" to --connected to--.

In Column 6, line 1, please delete "at";
    line 4, please change "reftactory" to --refractory--;
    line 7, please change "a" to --an--;
    line 8, please change "a" to --an--;
    line 9, please change "a" to --an--;
    line 16, please change "sorrounding" to --surrounding--;
    line 34, please delete "the", second occurrence;
    line 35, please change "non-combusible" to --non-combustible--;
    line 38, please change "as" to --is used as the-- and after "gas", please delete "is used";
    bridging lines 39 and 40, please change "almina" to --alumina--;
    line 40, please change "zilcon, zilconia" to --zircon, zirconia--;

UNITED STATES PATENT AND TRADEMARK OFFICE
CERTIFICATE OF CORRECTION

PATENT NO. : 5,061,527

DATED : October 29, 1991

INVENTOR(S) : Seiji Watanabe et al

It is certified that error appears in the above-indentified patent and that said Letters Patent is hereby corrected as shown below:

line 41, please change "the combination" to --combinations--;
    line 46, please change "aluminium" to --aluminum--; please change "the combination" to --combinations-- and please change the period after "thereof" to a comma --,--;
    line 47, please change "Also" to --also--;
    line 48, please delete "the" and please delete "can be used as metal";
    line 49, please change "in the" to --of an--;
    bridging lines 50 and 51, please change "combusbility" to --combustibility--;
    line 51, please change "substanmtially" to --substantially--;
    line 53, after "in", second occurrence, please insert --the--;
    line 55, please delete "the";
    line 61, please change "non-combusible" to --non-combustible--;
    line 63, please change "non-combusible" to --non-combustible--;
    line 65, please change "the" to --a--; and
    bridging lines 65 and 66, please change "combusibility" to --combustibility--.

In Column 7, line 1, please change "operation" to --operations--;
    line 5, please change "variation" to --variations--;
    line 8, please delete "take place";

UNITED STATES PATENT AND TRADEMARK OFFICE
CERTIFICATE OF CORRECTION

PATENT NO. : 5,061,527
DATED : October 29, 1991
INVENTOR(S) : Seiji Watanabe et al It is certified that error appears in the above-indentified patent and that said Letters Patent is hereby corrected as shown below:

bridging lines 8 and 9, please change "aluminium" to --aluminum--;
line 9, please change "material of combusible" to --combustible--;
line 10, please change "is" to --was--;
line 12, before "amount", please insert --the--; after "of", please delete "the"; and please change "is" to --was--;
line 13, after "values", please insert --of--;
line 16, please change "aluminium" to --aluminum-- and please change "is" to --was--;
line 19, please change "is" to --was--;
line 24, please change "is" to --was--;
bridging lines 25 and 26, please change "aluminium" to --aluminum--;
line 26, please change "powderle is" to --powder was--;
line 28, please change "aluminium" to --aluminum--;
line 29, please delete "of calory";
line 30, please change "alminium" to --aluminum-- and please change "no calory" to --with no calories--;
line 33, please change "at the average size" to --to be--;
line 38, please change "providing calory" to --calories--;
line 40, please delete "size in";
line 41, please change "aluminium" to --alunminum--;
line 44, please change "at the average size" to --to be--;

UNITED STATES PATENT AND TRADEMARK OFFICE
CERTIFICATE OF CORRECTION

PATENT NO. : 5,061,527
DATED : October 29, 1991
INVENTOR(S) : Seiji Watanabe et al It is certified that error appears in the above-indentified patent and that said Letters Patent is hereby corrected as shown below:

line 46, please change "would", first occurrence, to --will--;
    line 48, please change "in diameter" to --to--;
    line 49, please change "would" to --will--;
    line 50, please change "preferabe" to --preferable--;
    line 51, please change "is" to --to--;
    line 56, please change "mixure" to --mixture--;
    line 57, please delete "an";
    bridging lines 57 and 58, please change "experimetation" to --experimentation--;
    line 59, please change "the", first occurrence, to --an-- and after "size", please insert --of--;
    bridging lines 59 and 60, please change "aluminium" to --aluminum--;
    line 60, please change "is utilzed" to --was utilized--;
    line 62, please change "supply calory" to --calorie supply-- and please change "at" to --to--;
    line 63, please change "is" to --was--;
    bridging lines 63 and 64, please change "icnreased" to --increased--;
    line 64, after "at", please insert --a-- and please change "according of increasing" to --with increase--;
    line 65, please change "aluminium" to --aluminum-- and please change "upto" to --up to--;
    line 66, please change "increasing" to --increase of the-- and before "adher-", please delete "the"; and
    line 67, please change "is" to --was--.

UNITED STATES PATENT AND TRADEMARK OFFICE
CERTIFICATE OF CORRECTION

PATENT NO. : 5,061,527

DATED : October 29, 1991

INVENTOR(S) : Seiji Watanabe et al

It is certified that error appears in the above-indentified patent and that said Letters Patent is hereby corrected as shown below:

In Column 8, line 4, please delete "of", first occurrence;
line 6, please delete "the", first occurrence;
line 9, please change "variation" to --variations--;
line 10, please change "content" to --contents--;
line 16, please delete "the";
line 17, please change "obsevation" to --observation--;
line 21, please delete "the";
line 25, please change "combustion" to --combust-- and after "generate", please insert --a--;
line 27, please change "combusible" to --combustible--;
line 29, please change "hald-melt" to --hard-melt--;
line 30, after "in", please insert --a--;
line 32, please change "combusible" to --combustible-- and before "sufficient", please insert --a--;
line 36, please change "is" to --was--;
line 37, before "alumina", please insert --an--; after "refractory", please insert --was provided--; and please change "has" to --had--;
line 39, please change "is" to --was--;
line 40, please change "aluminium particle" to --aluminum particles--;
line 41, please change "aluminium particle is" to --aluminum particles were--;
line 42, please change "in a rate of" to --at a percentage of--;
line 44, please change "Amount" to --The amount--;
line 46, after "including", please insert --the--;
line 47, please change "aluminium" to --aluminum--;

UNITED STATES PATENT AND TRADEMARK OFFICE
CERTIFICATE OF CORRECTION

PATENT NO. : 5,061,527
DATED : October 29, 1991
INVENTOR(S) : Seiji Watanabe et al It is certified that error appears in the above-indentified patent and that said Letters Patent is hereby corrected as shown below:

```
     line 49, please delete "the", second occurrence;
     line 51, please change "theoritical" to --theoretical--;
     line 52, please change "aluminium" to --aluminum-- and
after "that", please insert --an--;
     line 56, please change "is" to --was--;
     line 57, after "held", please insert --to--;
     line 58, please change "is" to --was-- and please change
"theoritical" to --theoretical--;
     line 60, please change "as" to --when--;
     line 61, please change "upto" to --up to-- and please
change "theoritical" to --theoretical--;
     line 63, please delete "of" and please change
"theoritical" to --theoretical--;
     line 66, please delete "of"; and
     line 67, please change "aluminium" to --aluminum--.

In Column 9, line 2, please delete "of" and please change
"theoritical" to --theoretical--;
     line 9, after "material,", please insert --a--;
     line 14, after "requires" please insert --a--;
     line 18, before "required", please insert --the--;
     line 27, please change "frame become" to --flame
becomes--;
     line 31, please change "calory" to --calories--;
     line 35, please delete "onto" and please change
"reflractory" to --refractory--;
     line 36, after "treated", please delete the comma;
     line 38, please change "contiune" to --continue--;
```

UNITED STATES PATENT AND TRADEMARK OFFICE
CERTIFICATE OF CORRECTION

PATENT NO. : 5,061,527
DATED : October 29, 1991
INVENTOR(S) : Seiji Watanabe et al It is certified that error appears in the above-indentified patent and that said Letters Patent is hereby corrected as shown below:

line 39, please change "combustioning calory" to --heat of combustion--
    line 43, please change "maetrial" to --material--;
    line 44, please change "retractory" to --refractory--;
    line 46, please change "on" to --to--;
    line 50, please change "frame" to --flame--; and
    line 55, please change "performcance" to --the performance--.

In Column 10, bridging lines 6 and 7, please change "aasociated" to --associated--;
    line 12, please change "atmospher" to --atmosphere--;
    line 14, please change "frame" to --flame--;
    line 15, please change "frame" to --flame--;
    line 24, please change "non-combusible" --non-combustible--;
    line 32, please change "non-combusible" to --non-combustible--;
    line 37, please change "reftractory" to --refractory--;
    bridging lines 41 and 42, please change "combusible" to --combustible--;
    line 42, please change "combusible" to --combustible--;
    bridging lines 43 and 44, please change "combusible mixutre" to --combustible mixture--;
    line 45, after "Upon", please insert --being--;
    line 47, after "subject", please insert --a--;
    line 48, please change "atmospher" to --atmosphere--;
    line 51, please change "frame" to --flame--;

UNITED STATES PATENT AND TRADEMARK OFFICE
CERTIFICATE OF CORRECTION

PATENT NO. : 5,061,527
DATED : October 29, 1991
INVENTOR(S) : Seiji Watanabe et al It is certified that error appears in the above-indentified patent and that said Letters Patent is hereby corrected as shown below:

line 52, please change "reflactory" to --refractory--;
    line 54, please change "combustioning frame propagrates" to --a combustioning flame is propagated--;
    line 56, please delete "onto" and please delete the comma "," after "11";
    line 58, please change "resultant" to --result--;
    line 59, after "and", please insert --be--;
    line 60, after "increases", please insert --the--;
    line 61, please change "reflactory" to --refractory--;
    line 63, after "completing", please insert --the--; and
    line 67, before "supply", please insert --the-- and after "shut", please insert --off--.

In Column 11, line 2, after "enable", please insert --it--;
    line 4, please change "prevent" to --prevents--;
    line 8, please change "appratus" to --apparatus--;
    line 9, please change "blick" to --brick--;
    line 10, before "hot", please insert --a--;
    line 11, please change "blick" to --brick-- and please change "almina" to --alumina--;
    bridging lines 11 and 12, please delete "operation is";
    line 12, before "performed", please insert --was-- and after "injecting", please insert --a--;
    line 13, please change "particle" to --particles-- and after "in", please insert --an--;
    line 14, please change "combustion-assiting" to --combustion-assisting--;
    line 15, please change "is" to --was--;

UNITED STATES PATENT AND TRADEMARK OFFICE
CERTIFICATE OF CORRECTION

PATENT NO. : 5,061,527
DATED : October 29, 1991
INVENTOR(S) : Seiji Watanabe et al It is certified that error appears in the above-indentified patent and that said Letters Patent is hereby corrected as shown below:

line 17, please change "Alminium" to --Aluminum-- and please change "combusible" to --combustible--;
    line 20, please change "aluminium" to --aluminum--;
    line 21, please delete "a";
    line 22, please change "size" to --sizes-- and please change "has" to --had--;
    line 23, please change "remainders is" to --remainder--;
    line 24, please delete "constituted of" and please change "aluminium" to --aluminum--;
    line 28, please change "frame" to --flame--;
    line 30, please change "reaches" to --reached--;
    line 32, please change "non-combisible" to --non-combustible--;
    line 33, please change "is" to --was--;
    line 35, please change "is" to --was--;
    line 38, before "satisfactory", please insert --a--;
    line 39, please change "blick" to --brick--;
    line 40, please change "blick" to --brick--;
    line 42, please change "blick" to --brick--;
    line 43, please change "repairing" to --repair--;
    line 55, please change "experimetation" to --experimentation--;
    line 58, please change "Pulication" to --Publication--;
    line 60, please change "alimunium" to --aluminum--;
    line 63, before "porosity", please insert --the--; please change "becomes" to --became--; and please delete "as";
    line 64, before "decreasing", please insert --while-- and please change "aluminium" to --aluminum--; and

UNITED STATES PATENT AND TRADEMARK OFFICE
CERTIFICATE OF CORRECTION

PATENT NO. : 5,061,527
DATED : October 29, 1991
INVENTOR(S) : Seiji Watanabe et al It is certified that error appears in the above-indentified patent and that said Letters Patent is hereby corrected as shown below:

line 68, please change "aluminium" to --aluminum-- and please delete "the".

In Column 12, line 1, before "average", please insert --an--;
    line 2, please change "the" to --a--;
    line 5, please change "with" to --while--;
    line 6, please change "appratus" to --apparatus--;
    line 10, please change "aluminium" to --aluminum--;
    line 15, please change "aluminium" to --aluminum--;
    line 18, before "greater", please insert --a--;
    bridging lines 18 and 19, please change "particule" to --particle--;
    line 20, please change "siginificant" to --significant--;
    line 26, please change "non-combusible" to --a non-combustible--;
    line 30, after "1", please delete the comma ",";
    line 31, please change "non-combusible" to --non-combustible-- and after "as", please insert --a--;
    line 36, please change "appratus" to --apparatus--;
    line 40, please change "non-combusible" to --non-combustible--;
    line 42, please change "non-combusible" to --non-combustible--;
    line 44, please change "non-combusible" to --non-combustible--;
    line 49, please change "feature" to --features--;
    line 52, please change "non-combusible" to --non-combustible--;

UNITED STATES PATENT AND TRADEMARK OFFICE
CERTIFICATE OF CORRECTION

PATENT NO. : 5,061,527

DATED : October 29, 1991

INVENTOR(S) : Seiji Watanabe et al

It is certified that error appears in the above-indentified patent and that said Letters Patent is hereby corrected as shown below:

line 53, please change "non-combusible" to --non-combustible--;
    line 60, please change "combusible" to --combustible--; and
    line 68, please change "combusible" to --non-combustible--;

In Column 13, line 3, please change "brantch" to --branch--;
    line 4, please change "line" to --lines--;
    line 6, please change "combustioning frame" to --a combustion flame--;
    bridging lines 17 and 18, please change "appratus" to --apparatus--;
    line 20, please change "non-combusible" to --non-combustible--;
    line 25, please change "non-combusible" to --non-combustible--; and
    line 28, after "avoid", please insert --the--.

Signed and Sealed this

Second Day of July, 1996

BRUCE LEHMAN

*Attest:*

*Attesting Officer*    *Commissioner of Patents and Trademarks*